United States Patent [19]

Stützel

[11] Patent Number: 4,536,548

[45] Date of Patent: Aug. 20, 1985

[54] HIGHLY TRANSPARENT, IMPACT-RESISTANT MODIFIED POLYVINYL CHLORIDE MOLDING COMPOSITIONS

[75] Inventor: Bernhard Stützel, Marl, Fed. Rep. of Germany

[73] Assignee: Chemische Werke Huels, A.G., Marl, Fed. Rep. of Germany

[21] Appl. No.: 491,698

[22] Filed: May 5, 1983

[30] Foreign Application Priority Data

May 6, 1982 [DE] Fed. Rep. of Germany ....... 3216989

[51] Int. Cl.³ .................... C08L 27/06; C08L 33/08; C08F 265/04
[52] U.S. Cl. .................... 525/227; 525/223; 525/225; 525/226; 525/303; 525/304; 525/308
[58] Field of Search ............... 525/223, 227, 308, 225, 525/226

[56] References Cited

U.S. PATENT DOCUMENTS

| | | | |
|---|---|---|---|
| 2,129,667 | 9/1938 | Barrett et al. | 260/2 |
| 2,396,434 | 3/1946 | Rehberg et al. | 260/488 |
| 3,334,156 | 8/1967 | Calentine et al. | 525/308 |
| 3,448,173 | 6/1969 | Ryan et al. | 525/308 |
| 3,751,449 | 8/1973 | Gobran et al. | 526/326 |
| 3,761,542 | 9/1973 | Kosaka et al. | 260/878 R |
| 3,776,982 | 12/1973 | Nicolet et al. | 525/308 |
| 3,840,620 | 10/1974 | Gallagher | 525/227 |
| 3,859,389 | 1/1975 | Carty et al. | 525/227 |
| 3,969,431 | 7/1976 | Gallagher | 525/308 |
| 4,041,106 | 8/1977 | Ide et al. | 260/876 R |
| 4,158,736 | 6/1979 | Lewis et al. | 560/205 |
| 4,357,435 | 11/1982 | Lewis | 525/223 |

FOREIGN PATENT DOCUMENTS 2013020  9/1971  Fed. Rep. of Germany .

Primary Examiner—Carman J. Seccuro
Attorney, Agent, or Firm—Millen & White

[57] ABSTRACT

Highly transparent, impact-resistant molded articles can be produced from a molding composition, comprising: (1) a major portion of polyvinyl chloride or a copolymer comprising at least 70% by weight of vinyl chloride units; and (2) an amount effective to impart impact resistance of: (a) at least one homopolymer of an acrylate monomer having the formula

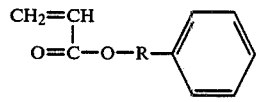

wherein R is a straight-chain or branched alkylene residue of 3–8 carbon atoms, optionally interrupted by 1–2 ether oxygen atoms, wherein the straight-chain portion of said alkylene residue contains at least 3 carbon atoms; or (b) a copolymer of said acrylate monomer and up to 30% by weight of at least one acrylate ester of a $C_{4-12}$ aliphatic alcohol.

16 Claims, 24 Drawing Figures

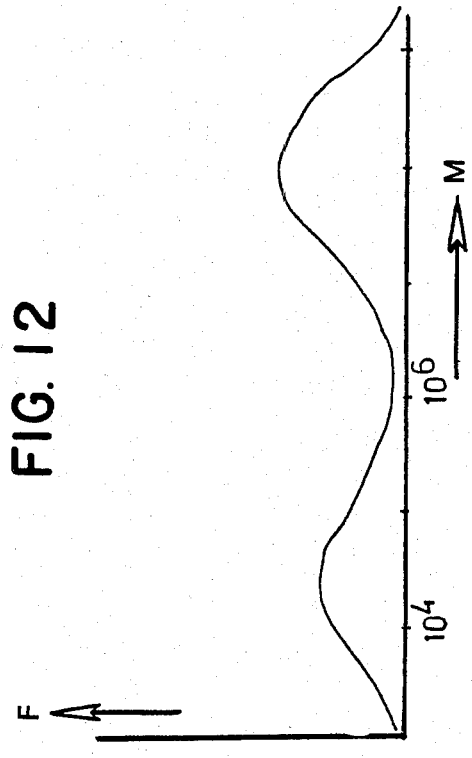
FIG. 9
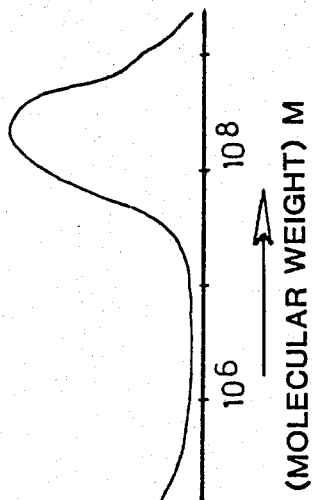
FIG. 11
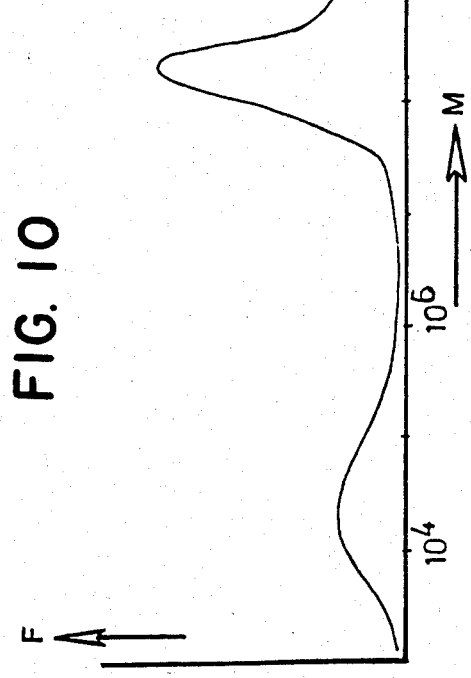
FIG. 10
FIG. 12

FIG. 13
FIG. 15
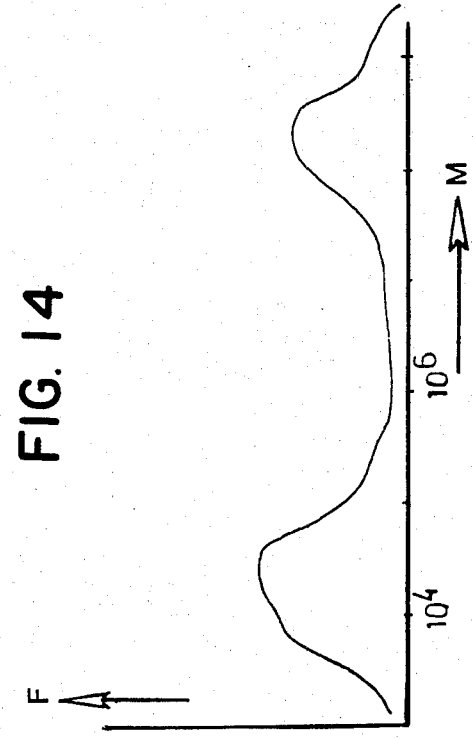
FIG. 14
FIG. 16

HIGHLY TRANSPARENT, IMPACT-RESISTANT MODIFIED POLYVINYL CHLORIDE MOLDING COMPOSITIONS

BACKGROUND OF THE INVENTION

This invention relates to modified polyvinyl chloride molding compositions comprising polymers of phenylalkyl or phenyloxaalkyl acrylates as the component imparting high impact resistance and transparency.

Modified polyvinyl chloride molding compositions exhibiting impact resistance and a certain transparency have been described in the literature.

Thus, for example, a graft copolymer has been produced from vinyl chloride and chlorinated polyethylene, which is disclosed as having superior properties with respect to transparency and impact resistance, according to DAS No. 2,003,331, especially at column 1, lines 1-25. However, as shown by the comparative tests disclosed herein, the properties of this graft polymer are definitely in need of improvement regarding transparency and impact resistance.

DAS No. 2,013,020 describes graft copolymers, prepared by first graft-polymerizing a monomer mixture of styrene or α-methylstyrene onto a butyl- or 2-ethylhexyl acrylate polymer in the presence of crosslinking comonomers and then polymerizing vinyl chloride in suspension in the presence of the resultant graft polymer.

Again, the comparative tests herein show that the polyvinyl chloride molding compositions prepared in this way are not yet satisfactory with regard to transparency and impact resistance.

Other literature references, such as, for example, German Pat. No. 2,621,522, describe transparent, impact-resistant polyvinyl chloride molding compositions produced by mixing polyvinyl chloride, a graft polymer and a copolymer, wherein the graft polymer and the copolymer each consist of at least three components and must be prepared by multistage polymerization. In view of this expensive manufacturing method, one objective of the present invention is to provide highly impact-resistant and highly transparent polyvinyl chloride molding compositions which can be manufactured at comparatively low cost.

SUMMARY OF THE INVENTION

This invention provides highly transparent, impact-resistant molding compositions based on polyvinyl chloride or copolymers comprising at least 70% by weight of vinyl chloride units, which comprise an effective amount for imparting impact resistance of homopolymers of acrylate monomers having the formula

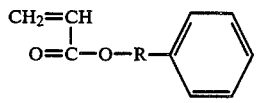

wherein R is a straight-chain or branched alkylene residue of 3-8 carbon atoms, optionally interrupted by 1-2 ether oxygen atoms, wherein the straight-chain portion of said alkylene residue contains at least 3 carbon atoms, or copolymers of the foregoing acrylate monomers and up to 30% by weight of acrylate esters of $C_{4-12}$ aliphatic alcohols.

In a process aspect, the invention provides a method of preparing these PVC-based molding compositions.

In a method of use aspect, the invention provides a method of imparting high impact resistance to PVC-based molded articles.

BRIEF DESCRIPTION OF THE DRAWING

The figures show molecular weight distribution curves for polyacrylates used to prepare molding compositions according to the invention.

DETAILED DISCUSSION

Figure 1:
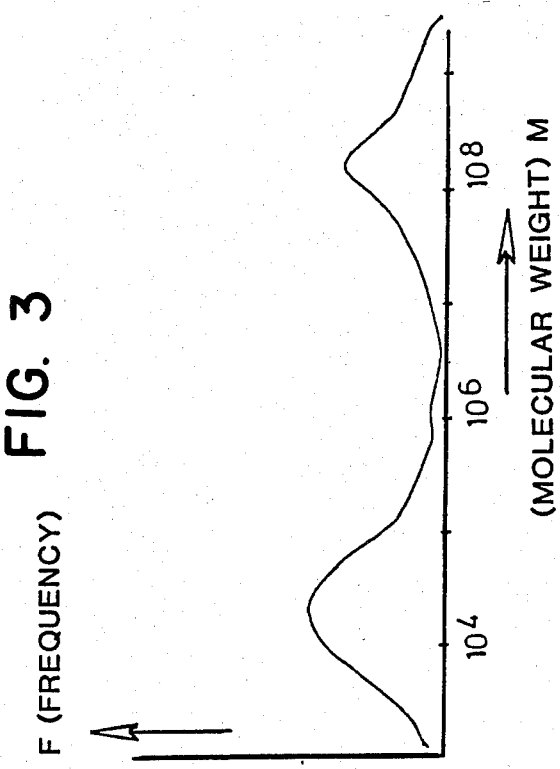

The component imparting impact resistance has a weight average molecular weight $M_w$ of about $10^4$ to $5\times10^8$, preferably about $5\times10^4$ to $5\times10^7$.

The highly transparent, impact-resistant molding compositions contain the component imparting impact resistance in amounts of about 1-30% by weight, preferably about 3-15% by weight, based on the mixture of polyvinyl chloride (or vinyl chloride copolymer) and components imparting impact resistance.

The component imparting impact resistance is a polyacrylate, optionally crosslinked, prepared from acrylate ester monomers which can have a variety of phenylalkyl or phenyloxaalkyl groups in the alcohol-derived component of the ester. Some of these esters are disclosed in detail in applicant's copending application, U.S. Ser. No. 491,699, entitled "Phenylalkyl And Phenyloxaalkyl Acrylates," filed on even date herewith, the disclosure of which is incorporated herein by reference.

Examples of acrylate monomers whose polymers are suitable for improving impact resistance of PVC molding compositions include, e.g.:

3-Phenylpropyl acrylate (R = propylene)

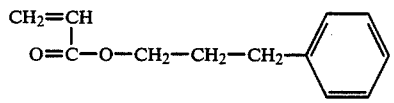

4-Phenylbutyl acrylate (R = butylene)

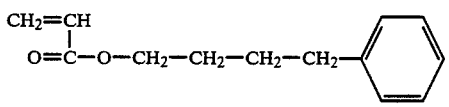

1-Methyl-3-phenylpropyl acrylate (R = 1-methylpropylene)

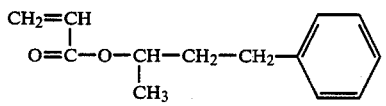

2-Methyl-3-phenylpropyl acrylate (R = 2-methylpropylene)

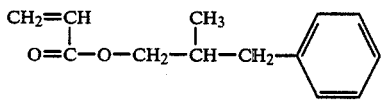

3-Methyl-3-phenylpropyl acrylate (R = 3-methylpropylene)

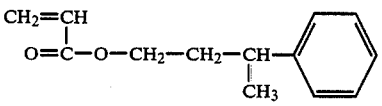

2-Phenylethoxyethyl acrylate (R = 3-oxapentylene)

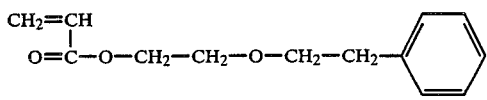

2-(Benzyloxy)propyl acrylate (R = 2-methyl-3-oxabutylene)

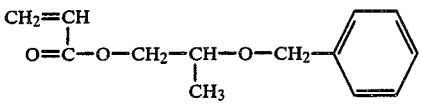

(3-Phenylpropoxy)ethyl acrylate (R = 3-oxahexylene)

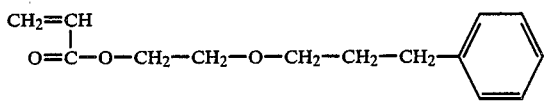

3-(Benzyloxy)propyl acrylate (R = 4-oxapentylene)

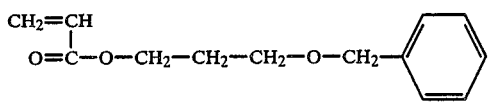

5-Phenylpentyl acrylate (R = pentylene)

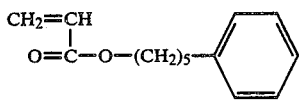

6-Phenylhexyl acrylate (R = hexylene)

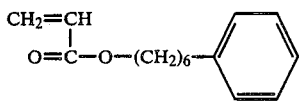

2-Ethyl-6-phenylhexyl acrylate (R = 2-ethylhexylene)

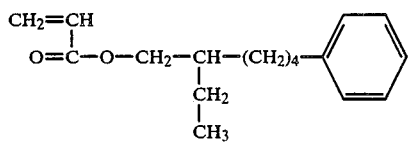

(3-Phenylisopropoxy)ethyl acrylate (R = 4-methyl-3-oxapentylene)

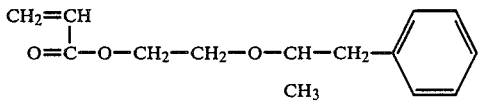

(2-Phenylethoxy)ethyl acrylate (R = 3-oxapentylene)

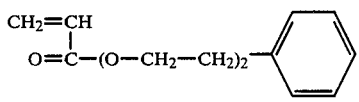

2-[(2-Phenylethoxy)ethoxy]ethyl acrylate (R = 3,6-dioxaoctylene)

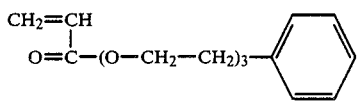

The acrylic acid esters can be prepared, inter alia, by direct esterification of the corresponding alcohols with acrylic acid. Representative such alcohols can be produced, e.g., according to the following known methods:

1. 3-Phenyl-1-propanol can be prepared from styrene by chemical addition of formaldehyde and subsequent hydrogenation, as disclosed in *Organic Syntheses*, Vol. IV, 786/787 and 798/799.

2. 4-Phenyl-1-butanol can be prepared from β-phenethyl-magnesium bromide and ethylene oxide, as disclosed in *J. Am. Chem. Soc.*, 46, 242 (1968).

3. 1-Methyl-3-phenyl-propanol can be obtained from methyl phenylethyl ketone by reduction, as disclosed in *Coll. Czech. Chem. Commun.*, 41 (8), 2264 (1976).

4. 3-Methyl-3-phenyl-1-propanol can be obtained, after preliminary trans-metallization, by reaction of the α-sodium salt of ethylbenzene with ethylene oxide as disclosed in Japan. Kokai No. 73 75 551, Jan. 14, 1972.

5. 2-Methyl-3-phenyl-1-propanol can be produced by alanate (aluminum hydride) reduction of the sodium salt of benzylmalonic acid diethyl ester, as disclosed in *Chem. Ber.*, 103, 3771 (1970).

6. Ethylene glycol monophenethyl ether is obtained from 2-phenylethanol and ethylene oxide under acid catalysis, as disclosed in *Bull. Soc. Chem.*, 8, 170–185 (1941).

Other alcohols corresponding to the foregoing class of esters can be synthesized analogously to the above alcohols or by other conventional routes. Other methods of preparing alcohols may be found, e.g., in Harrison et al., "Compendium of Organic Synthetic Methods" (Wiley-Interscience, 1971) and similar general texts.

The component imparting impact resistance can be an acrylate homopolymer or copolymer. The homopolymer has the formula

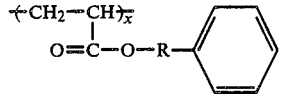

wherein R is a straight-chain or branched alkylene residue of 3–8 carbon atoms optionally interrupted by 1–2 ether oxygen atoms, wherein the straight-chain portion of said alkylene residue contains at least 3 carbon atoms; and x is a number from 20 to 500,000, preferably from 50 to 50,000.

Certain of the aforementioned polymers of phenyl-substituted acrylic esters, wherein $R = +CH_2+_y$ with y being 5–8, and their preparation have been described in U.S. Pat. No. 3,751,449. They are disclosed, in this literature reference, to be useful as pressure-sensitive adhesives, but their utility as a valuable component of PVC compositions has not been recognized heretofore.

The phenylalkyl and phenyloxaalkyl acrylate polymers can be prepared by conventional polymerization techniques, e.g., bulk, solution, emulsion and/or suspension polymerization. These techniques are described, e.g., by Riddle, in the monograph "Monomeric Acrylic Esters", pages 37–56, (Reinhold Publishing Corp., 1954), or also by Horn, in the monograph "Acrylic Resins", pages 26–29, (Reinhold Publishing Corp., 1960).

These polymers, and their preparation, are described in detail in applicant's copending application U.S. Ser. No. 491,837, entitled "Polymeric Phenylalkyl And Phenyloxaalkyl Acrylates, And Preparation Thereof," filed on even date herewith, the disclosure of which is incorporated herein by reference.

Production of the polymers by emulsion polymerization is particularly advantageous. Suitable emulsifiers include the conventional types. Suitable, in particular, are ionic emulsifiers, e.g., salts of carboxylic acids, such as sodium caprate, laurate, myristate or palmitate. Also suitable are salts of primary and secondary alkyl sulfates, e.g., sodium capryl sulfate, sodium lauryl sulfate, sodium myristyl sulfate, and sodium oleyl sulfate. Also usable are sulfates of esterified polyoxy compounds, such as monofatty acyl glycerol sulfates, salts of primary and secondary alkyl sulfonates, such as sodium methyl sulfonate, sodium stearyl sulfonate, sodium oleyl sulfonate, $C_{13\text{-}17}$ n-alkanesulfonates with a statistical distribution of sulfonic acid groups, and the like. It is also possible to utilize alkylaryl sulfonates, e.g., the sodium salt of p-n-dodecylbenzene sulfonic acid. Mixtures of emulsifiers are also suitable.

Auxiliary agents can also be combined with the aforementioned emulsifiers. Suitable such agents include: alcohols, e.g., lauryl alcohol; esters, e.g., sorbitan monolaurate; carboxylic acid glycol esters; and the like.

The concentration of the emulsifiers should be 0.1–3% by weight, preferably 0.5–2% by weight, based on monomers.

Suitable catalysts include the water-soluble compounds customarily employed in emulsion polymerization, such as: water-soluble persulfates, e.g., Na or K persulfate, optionally combined with a reducing component, such as water-soluble bisulfite, hydrosulfite, hydrazine, thiosulfate, formaldehyde sulfoxylates; hydrogen peroxide combined with reducing components, such as bisulfite, hydrazine, hydroxylamine, or ascorbic acid, or one or more water-soluble persulfates combined with hydrogen peroxide and an activating component, such as copper salts, which are to be used in an alkaline medium with complexing agents, such as pyrophosphates. The usual concentrations are employed.

The polymerization temperature can be 5°–120° C., but is preferably 40°–90° C. The polymers normally exhibit a broad molecular weight distribution, as will be explained below with the aid of the examples. These broad molecular weight distributions manifest themselves in the average values for the molecular weight, determined by gel permeation chromatography (GPC), in that number-average molecular weight values range from about $5\times10^3$ to about $5\times10^4$ and weight-average molecular weight values range from about $5\times10^5$ to about $5\times10^8$. Incorporated catalyst residues occur conventionally as the end groups. The polymers are atactic.

For solution polymerization, suitable solvents include, e.g.: aromatic hydrocarbons, such as toluene, xylene, and the like; ethers, such as tetrahydrofuran, diethyl ether; or like compounds.

Suitable catalysts include, e.g.: organic peroxides, such as benzoyl peroxide, succinyl peroxide, lauroyl peroxide, or the like; percarbonates, such as isopropyl percarbonate, cyclohexyl percarbonate; peroxycarbonates, such as dicetyl peroxydicarbonate; azo compounds, such as azobisisobutyronitrile, and the like.

The polymerization temperature should range between 20° and 120° C.

For bulk polymerization, suitable catalysts include, e.g.: organic peroxides, such as benzoyl peroxide, succinyl peroxide, lauroyl peroxide; percarbonates, such as isopropyl percarbonate, cyclohexyl percarbonate; peroxydicarbonates, such as dicetyl peroxydicarbonate; azo compounds, such as azobisisobutyronitrile, and the like.

The polymerization temperature should be 20°–180° C.

For suspension polymerization, suitable suspension stabilizers include, e.g.: commercially available hydroxypropylcelluloses, hydroxyethylcelluloses, partially saponified acetates, polyvinylpyrrolidone, methylcelluloses, gelatin, or mixtures of these stabilizers.

Suitable catalysts include, e.g.: organic peroxides, such as benzoyl peroxide, succinyl peroxide, lauroyl peroxide; percarbonates, such as isopropyl percarbonate, cyclohexyl percarbonate; peroxydicarbonates, such as dicetyl peroxydicarbonate; azo compounds, such as azobisisobutyronitrile, and the like.

The polymerization temperature should be 20°–120° C.

The polyacrylate component imparting impact resistance can also be a copolymer containing up to 30% by weight, preferably up to 20%, of acrylic acid esters of $C_{4\text{-}12}$ aliphatic alcohols, preferably $C_{4\text{-}12}$ alkanols. Suitable such esters include, e.g., n-butyl acrylate, isobutyl acrylate, n-hexyl acrylate, isohexyl acrylate, n-octyl acrylate, 2-ethylhexyl acrylate, n-decyl acrylate, isodecyl acrylate, n-dodecyl acrylate, isododecyl acrylate, and the like. These esters are also readily prepared by conventional esterification of the alcohols, which are readily available, known or accessible by conventional synthetic methods.

The copolymers with up to 30% by weight of acrylic acid esters of $C_{4\text{-}12}$ aliphatic alcohols are prepared according to any of the aforementioned techniques, resulting in incorporation in the polymer of recurrent units of the formula

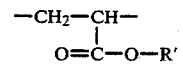

wherein R' is a $C_{4\text{-}12}$ aliphatic group.

The polyacrylate component imparting impact resistance, having a weight average molecular weight of 10,000 to $5\times10^8$, preferably 20,000–500,000, can be incorporated directly into polyvinyl chloride. However, it is also possible to conduct the polymerizations of the phenyl-substituted acrylic acid esters in the presence of cross-linking agents. Also, it is possible to react the acrylate polymers with compounds having a cross-linking effect, i.e., a crosslinking agent. Such measures permit control of the type and degree of crosslinking in the polymer.

Suitable such compounds having a crosslinking effect, typically bis-ethylenic compounds, include, e.g.: divinylbenzene; divinyl esters of dibasic and tribasic acids, e.g., divinyl adipate; diallyl esters of polyfunctional acids. e.g., diallyl phthalate; divinyl ethers of polyhydric alcohols, e.g., divinyl ether of ethylene glycol; and di- and trimethacrylates and -acrylates of polyhydric alcohols. Especially suitable are the commercially available representatives of the last-mentioned group since they can be readily copolymerized with acrylic acid esters and impart to the finished mixture an improved thermal stability. Examples are: lower alkylene glycol acrylates, e.g., ethylene glycol dimethacrylate, propylene glycol dimethacrylate, 1,3-butylene glycol dimethacrylate, 1,4-butylene glycol dimethacrylate, as well as the corresponding diacrylates.

The crosslinking reaction can be conducted conventionally at temperatures of 20°–180° C., preferably 40°–90° C., with amounts from about 0.1 to about 5% by weight of crosslinking agent, based on the polymer.

The polyacrylate polymers shown above, optionally comprising a minor proportion of alkyl acrylate, are advantageously added to polyvinyl chloride as the component imparting improved impact resistance. Advantageously, 1–30% by weight, preferably 3–15% by weight of the polyacrylate is incorporated. This results in molding compositions having a surprisingly high impact resistance and transparency.

The polyacrylates will impart somewhat different degrees of improved transparency and impact resistance to polyvinyl chloride and some may be more suitable for particular uses than others. For example, polymers of 3-phenylpropyl acrylate or 4-phenylbutyl acrylate, optionally including a minor proportion of, e.g., butyl acrylate, are especially effective in improving transparency and impact resistance of, e.g., molded polyvinyl chloride panels and similar molded articles.

The polyvinyl chloride employed can be manufactured in any desired fashion, as disclosed, e.g., in the monograph by Kainer, "Polyvinylchlorid und Vinylchlorid-Mischpolymerisate" (Polyvinyl Chloride and Vinyl chloride Copolymers), pp. 1–59, (Springer Publishers, Berlin/Heidelberg/New York, 1965). Suitable such PVC polymers, and/or copolymers comprising at least 70% of vinyl chloride units, advantageously have weight average molecular weights of about 35,000–150,000 (K value 40–90, the K value being described in the above mentioned Kainer monograph, page 135.

Examples of such PVCs include, e.g., polymers prepared according to the methods of DOS No. 1,595,431 or DOS No. 2,531,780, including PVCs prepared by suspension, emulsion, bulk or solution polymerization.

The introduction of the polymers imparting impact resistance can be effected by any conventional methods of modification, including, e.g., graft polymerization of vinyl chloride onto the polyacrylate or by any kind of blending of polyvinyl chloride with the polyacrylate, for example, by mixing in the solid phase with the use of, e.g., a roller mill, a Banbury mixer, a plastograph, a compounder-extruder, or the like. Optionally, the components can also be premixed using, e.g., a finned-agitator mixer or a Henschel mixer. The polyvinyl chloride and the polyacrylate can also be blended together in latex form and then conventionally dried, e.g., by spray-drying.

Graft polymerization of vinyl chloride onto the polyacrylates imparting impact resistance is advantageously effected by conventional techniques, as disclosed, e.g., in the above mentioned Kainer monograph, page 111 et seq.

A suitable process comprises adding vinyl chloride under pressure to a polyacrylate latex, prepared as described hereinabove, in the presence of one or more suspension stabilizers and one or more radical catalysts, and effecting a suspension polymerization at a temperature of about 35°–85° C. The resultant graft copolymer of PVC and polyacrylate can be isolated, e.g., after conventional filtration, washing and drying, as a pourable powder suitable for molding.

Conventional additives, such as stabilizers, plasticizers, mold release agents, and the like can be added to the polyvinyl chloride molding compositions modified by incorporation of the polyacrylate component imparting impact resistance. These additives can also be expediently incorporated as early as during the blending of the polyvinyl chloride with the component imparting impact resistance.

Suitable such stabilizers are described, e.g., in the above mentioned Kainer monograph, page 209 et seq.

Suitable plasticizers are described, e.g., in the above mentioned Kainer monograph, page 275 et seq.

Suitable lubricants are described, e.g., in the above mentioned Kainer monograph, page 258 et seq.

Modified PVC molding compositions according to the invention can be formed into highly transparent and impact-resistant PVC-based articles. It can be seen from the numerous examples disclosed herein that use of certain of these compositions can result in molded articles having a higher transparency than a bulk PVC containing the same processing additives. That is, addition of the disclosed polyacrylates to PVC molding compositions improves the transparency of the resultant molded articles over that which could be obtained from bulk PVC alone. The choice of polyacrylate additive will depend upon the desired balance between transparency, impact resistance, cost and other variables normally considered for such manufacturing decisions.

Molded articles prepared from the modified PVC molding compositions of the invention can be made using conventional molding techniques, as described in, e.g., Kunststoff Handbuch Polyvinylchloride, Vol. 2, Carl Hanser Verlag, München 1963, part 1, chapter 4 and 6.

Typical applications wherein high transparency and high impact resistance are important include the manufacture of, e.g., sheets for greenhouses and hot beds, sheets for factory halls and sport halls (walls and roofs), injection molding articles for lamp houses, cover plates, cover disks, etc.

It is surprising and unexpected that the addition of a single polyacrylate homopolymer or copolymer to polyvinyl chloride would yield highly transparent molding compositions having a high impact resistance, the impact resistance and transparency of which are superior, in some cases, to those of molding compositions having a structure as complicated as disclosed in the manufacturing process described in DAS No. 2,013,020 (see Examples).

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

(A) PREPARATION OF PHENYL-SUBSTITUTED ACRYLIC ACID ESTER

Example 1

The following components are charged into a 4-liter three-necked flask with agitator, reflux condenser, water trap, dropping funnel, and heater:

43 parts (2,150 g) of 3-phenyl-1-propanol
10 parts (500 g) of toluene
0.4 part (20 g) of toluenesulfonic acid
0.02 part (1 g) of hydroquinone
17.3 parts (865 g) of acrylic acid is present in the dropping funnel.

Under agitation, 0.5 part (25 g) of acrylic acid is introduced from the dropping funnel into the charged reaction mixture, and the contents of the flask are heated to 150°–170° C. Once water begins to appear in the water trap, the residual acrylic acid is added dropwise over about 3 hours, and the subsequently separated water is removed in incremental portions until at least 95% of the amount of water theoretically to be expected has been attained.

For working up purposes, the cooled product is washed with NaHCO₃ solution and water; the aqueous phase is separated in a separatory funnel, and the organic phase is distilled. After removing the toluene by distillation at about 100 mbar, acrylic acid ester and alcohol are separated by way of a column.

Boiling point of 3-phenyl-1-propanol: 109° C./6 mbar.

Boiling point of 3-phenyl-1-propanol acrylic acid ester: 120° C./6 mbar.

Example 2

The following compounds are utilized in the way described in Example 1:
47 parts (2,350 g) of 4-phenyl-1-butanol
10 parts (500 g) of toluene
0.4 part (20 ) of toluenesulfonic acid
0.02 part (1 g) of hydroquinone
The dropping funnel contains 17.3 parts (865 g) of acrylic acid.

The conductance of the reaction and working up processes takes place as described in Example 1.

Boiling point of 4-phenyl-1butanol: 116° C./6 mbar.

Boiling point of 4-phenyl-1-butanol acrylic acid ester: 126° C./6 mbar.

Example 3

The following materials are used as described in Example 1:
47 parts (2,350 g) of 3-phenyl-3-methyl-1-propanol
10 parts (500 g) of toluene
0.4 part (20 g) of toluenesulfonic acid
0.02 part (1 g) of hydroquinone
The dropping funnel contains 17.3 parts (865 g) of acrylic acid.

The reaction and working up processes are conducted as described in Example 1.

Boiling point of 3-phenyl-3-methyl-1-propanol: 114° C./6 mbar.

Boiling point of 3-phenyl-3-methyl-1-propanol acrylic acid ester: 123° C./6 mbar.

Example 4

The following components are provided as described in Example 1:
47 parts (2,350 g) of 3-phenyl-2-methyl-1-propanol
10 parts (500 g) of toluene
0.4 part (20 g) of toluenesulfonic acid
0.02 part (1 g) of hydroquinone
The dropping funnel contains 17.3 parts (865 g) of acrylic acid.

The reaction and working up processes are carried out as disclosed in Example 1.

Boiling point of 3-phenyl-2-methyl-1-propanol: 114° C./6 mbar.

Boiling point of 3-phenyl-2-methyl-1-propanol acrylic acid ester: 123° C./6 mbar.

Example 5

The following compounds are provided as set forth in Example 1:
47 parts (2,350 g) of 3-phenyl-1-methyl-1-propanol
10 parts (500 g) of toluene
0.4 part (20 g) of toluenesulfonic acid
0.02 part (1 g) of hydroquinone
17.3 parts (865 g) of acrylic acid is found in the dropping funnel.

The reaction and working up steps are conducted as described in Example 1.

Boiling point of 3-phenyl-1-methyl-1-propanol: 114° C./6 mbar.

Boiling point of 3-phenyl-1-methyl-1-propanol acrylic acid ester: 123° C./6 mbar.

Example 6

The following compounds are provided as disclosed in Example 1:
50 parts (2,500 g) of ethylene glycol monophenethyl ether
10 parts (500 g) of toluene
0.4 part (20 g) of toluenesulfonic acid
0.02 part (1 g) of hydroquinone
The dropping funnel contains 17.3 parts (865 g) of acrylic acid.

The reaction and working up processes take place as described in Example 1.

Boiling point of ethylene glycol monophenethyl ether: 122° C./6 mbar.

Boiling point of ethylene glycol monophenethyl ether acrylic acid ester: 132° C./6 mbar.

(B) PRODUCTION OF POLYACRYLIC ACID ESTER

Example 7

A 2-liter steel autoclave equipped with agitator, temperature control, as well as customary devices for evacuation, feeding of N₂ gas, filling and metered introduction of reactants (manufacturer, for example SFS/Buechi, Uster, Switzerland) is charged with the following ingredients:
20 parts (250 g) of 3-phenyl-1-propanol acrylic acid ester
76 parts (950 g) of fully demineralized water
0.24 part (3 g) of Na laurate
The following components are introduced into the receiver of the metered feeding means:
0.012 part (0.15 g) of ammonium peroxodisulfate
4 parts (50 g) of fully dimineralized water
After driving out gases and purging with N₂, the content of the reactor is heated to 80° C. under 2 bar excess N₂ pressure. During the heating step, 5 ml of the ammonium peroxodisulfate solution is added; the remainder is fed uniformly in metered quantities during the course of 120 minutes, and the reaction temperature is maintained at 80° C. The reaction is finished after another 30 minutes. The mixture is allowed to cool, thus obtaining a white, stable polyacrylate latex.

These polyacrylates have a very broad molecular weight distribution. Gel permeation chromatography (GPC) is utilized for an in-depth characterization of this distribution; in each case, a solution of the polymer in tetrahydrofuran was used for this purpose. In this way, the molecular weight distribution and the average values for the molecular weight customary when characterizing polymers can be indicated—the number average $M_n = \Sigma n_i M_i / \Sigma n_i$, and the weight average $M_w = \Sigma n_i M_i^2 / \Sigma n_i M_i$:
$M_n = 8.1 \times 10^3$
$M_w = 13.4 \times 10^7$ The molecular weight distribution curve is shown in FIG. 1.

Example 7a

Figure 2:
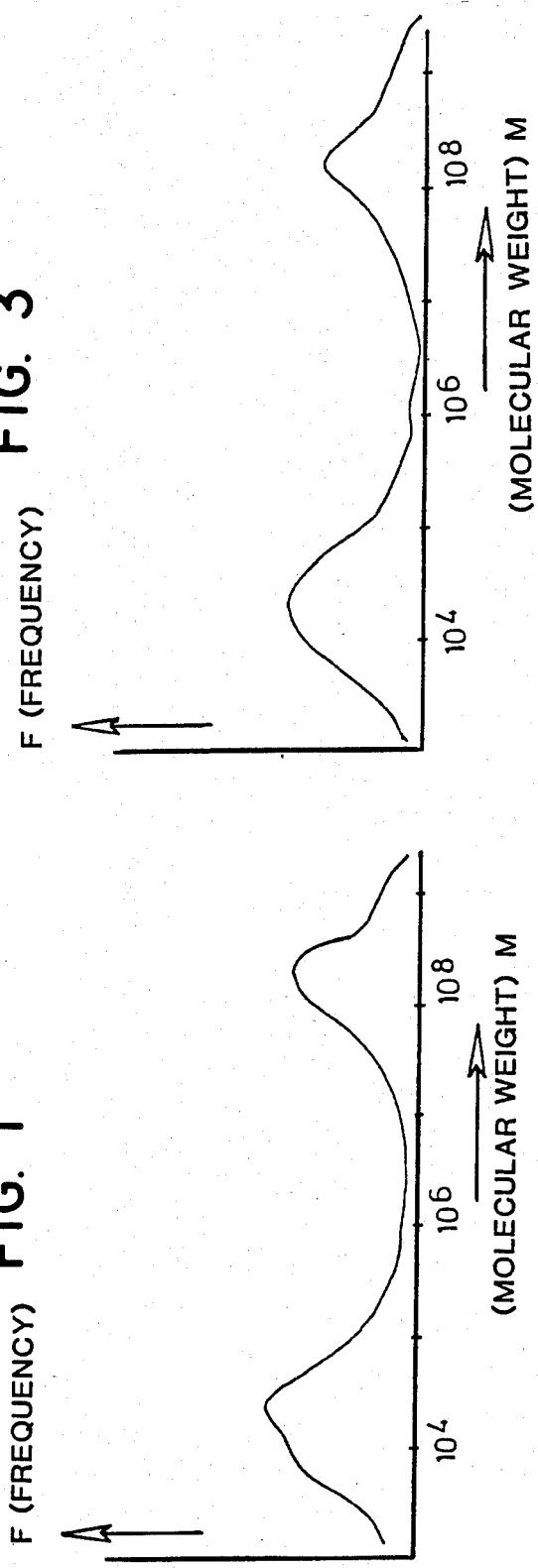

Polymerization is conducted in the apparatus described in Example 7, in the way described in the latter example, also in the presence of compounds having a cross-linking effect. For this purpose, the following ingredients are provided:

20 parts (250 g) of 3-phenyl-1-propanol acrylic acid ester
76 parts (950 g) of fully demineralized water
0.2 part (2.5 g) of diallyl phthalate
0.24 part (3.0 g) of Na laurate The following components are introduced into the receiver of the metering means:

0.012 part (0.15 g) of ammonium peroxodisulfate
4 parts (50 g) of fully diminerealized water A white, stable polyacrylate latex is obtained. Molecular weight characterization by GPC (see note in Example 7) yields $M_n = 2.4 \times 10^4$
$M_w = 21 \times 10^7$ The molecular weight distribution is illustrated in FIG. 2.

Examples 8-12

In the apparatus described in Example 7, the acrylic acid esters prepared according to Examples 2-6 are polymerized in the way described in Example 7. The following compounds are utilized for this purpose:

20 parts (250 g) of phenyl-substituted acrylic acid ester
76 parts (950 g) of fully demineralized water
0.24 part (3 g) of Na laurate The following components are introduced into the receiver of the metering means:

0.012 part (0.15 g) of ammonium peroxodisulfate
4 parts (50 g) of fully demineralized water In each case, a white, stable polyacrylate latex is obtained.

Figure 3:
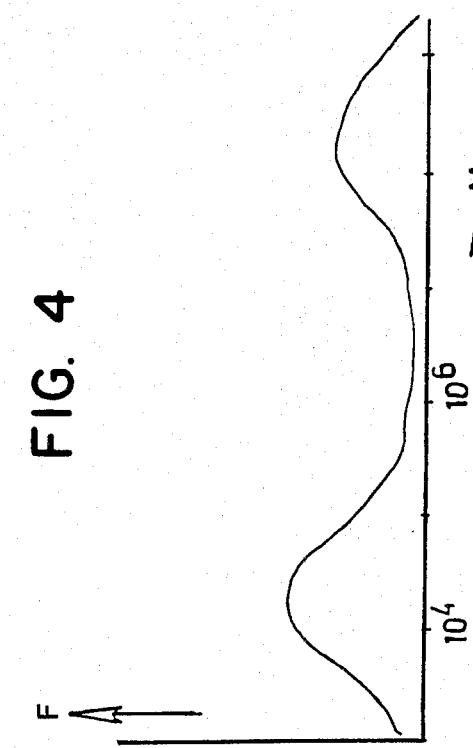
Figure 4:
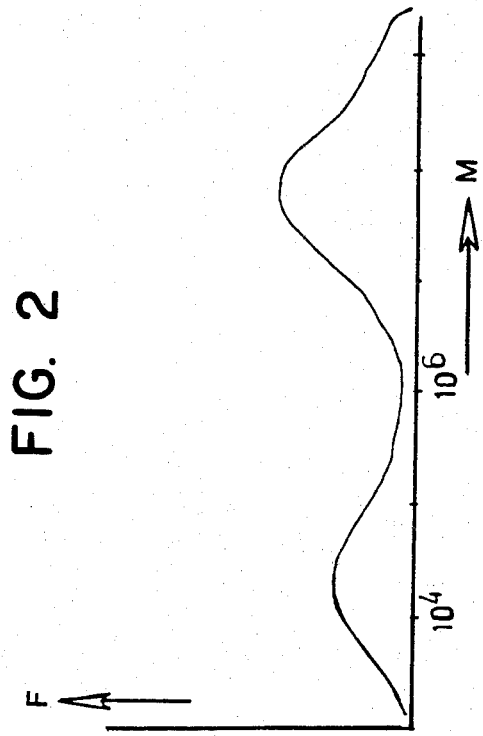
Figure 5:
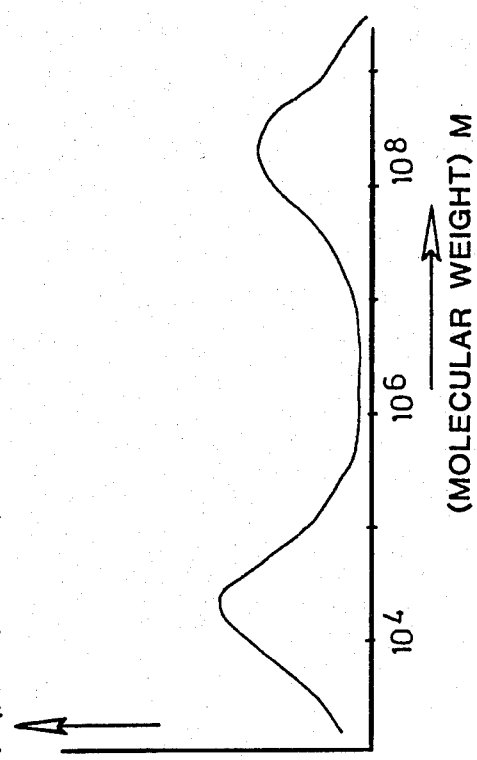
Figure 7:
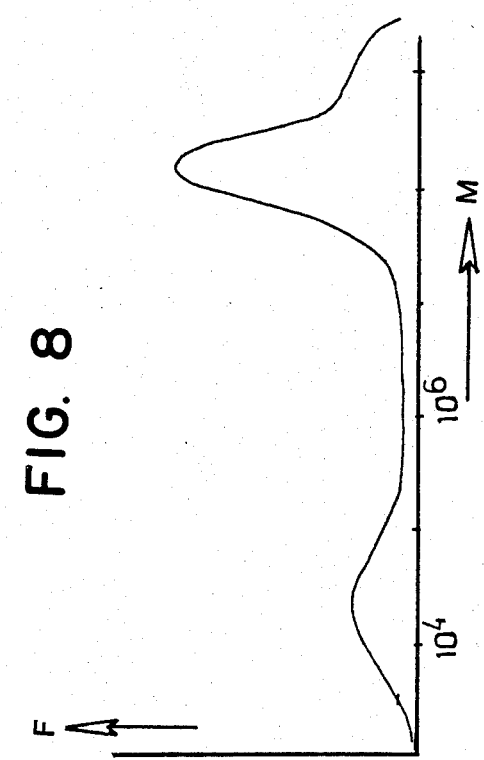
Figure 6:
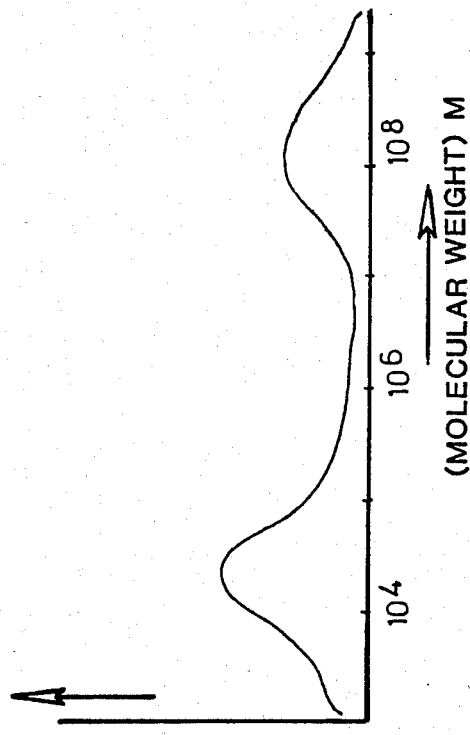

Molecular weight characterization by GPC (see note in Example 7) yields:

with Example 8 $M_n = 9.3 \times 10^3$; $M_w = 14.4 \times 10^7$; molecular weight distribution curve, see FIG. 3;
with Example 9 $M_n = 8.5 \times 10^3$; $M_w = 13.5 \times 10^7$; molecular weight distribution curve, see FIG. 4;
with Example 10 $M_n = 8.4 \times 10^3$; $M_w = 12.3 \times 10^7$; molecular weight distribution curve, see FIG. 5;
with Example 11 $M_n = 8.2 \times 10^3$; $M_w = 11.5 \times 10^7$; molecular weight distribution curve, see FIG. 6;
with Example 12 $M_n = 7.6 \times 10^3$; $M_w = 12.1 \times 10^7$; molecular weight distribution curve, see FIG. 7.

Examples 8a-12a

The polymerizations of the acrylic acid esters produced according to Examples 2-6, as described in Examples 8-12, are conducted also in the presence of compounds having a crosslinking effect. For this purpose, the following ingredients are respectively employed:

20 parts (250 g) of phenyl-substituted acrylic acid ester
76 parts (950 g) of fully demineralized water
0.2 part (2.5 g) of diallyl phthalate
0.24 part (3.0 g) of Na laurate The following compounds are introduced into the receiver of the metering device:

0.012 part (0.15 g) of ammonium peroxodisulfate
4 parts (50 g) of fully demineralized water In each case, a white, stable polyacrylate latex is obtained.

Figure 8:
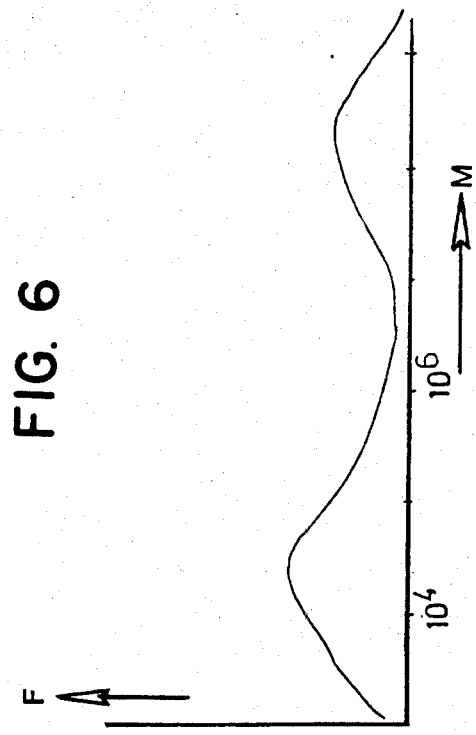

The molecular weight characterization by GPC (see note in Example 7) yields:

with Example 8a $M_n = 3.14 \times 10^4$; $M_w = 33.8 \times 10^7$; molecular weight distribution curve, see FIG. 8;
with Example 9a $M_n = 2.45 \times 10^4$; $M_w = 21.1 \times 10^7$; molecular weight distribution curve, see FIG. 9;
with Example 10a $M_n = 3.05 \times 10^4$; $M_w = 33.2 \times 10^7$; molecular weight distribution curve, see FIG. 10;
with Example 11a $M_n = 2.8 \times 10^4$; $M_w = 26.3 \times 10^7$; molecular weight distribution curve, see FIG. 11;
with Example 12a $M_n = 2.3 \times 10^4$; $M_w = 20.3 \times 10^7$; molecular weight distribution curve, see FIG. 12.

Examples 13-18

Using the apparatus described in Example 7, it is also possible to produce copolymers of the phenyl-substituted acrylic acid esters with alkyl acrylates. The following compounds are utilized, for example, to achieve this end:

18 parts (225 g) of phenyl-substituted acrylic acid ester, prepared according to Examples 1-6
4 parts (50 g) of butyl acrylate
76 parts (950 g) of fully demineralized water
0.24 parts (3 g) of Na laurate The following compounds are introduced into the receiver of the metering means:

0.012 part (0.15 g) of ammonium peroxodisulfate
4 parts (50 g) of fully demineralized water In each case, a white, stable polyacrylate latex is obtained.

Figure 17:
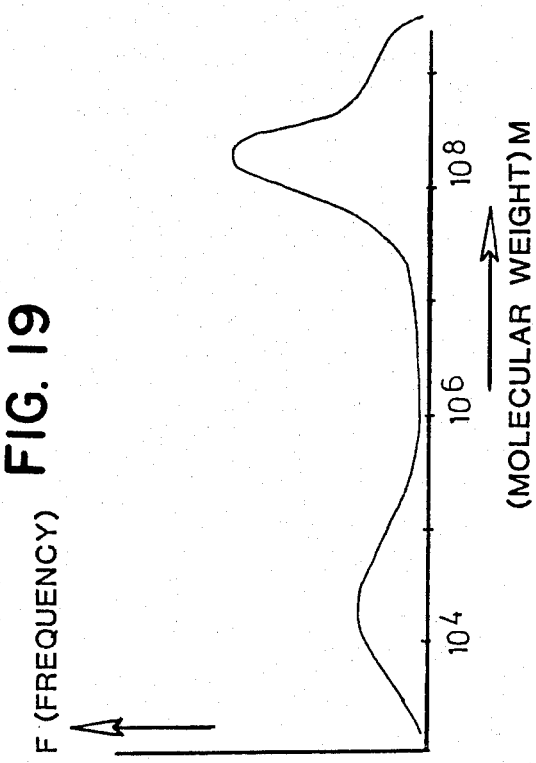
Figure 18:
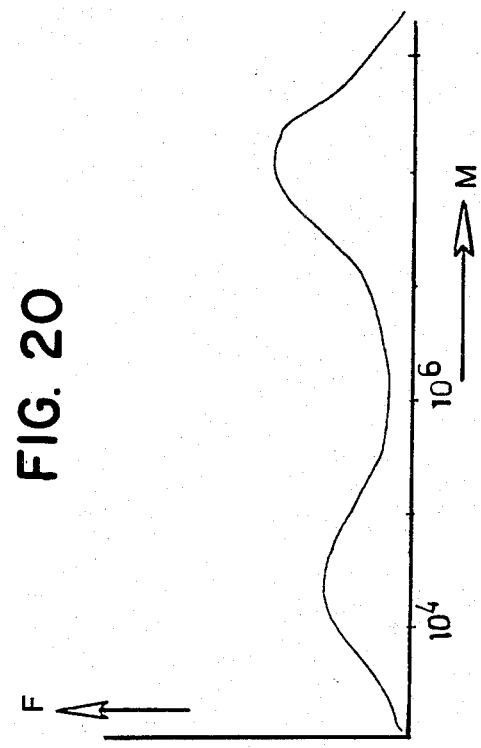

Molecular weight characterization by GPC (see note in Example 7) yields:

with Example 13 $M_n = 9.6 \times 10^3$; $M_w = 14.8 \times 10^7$; molecular weight distribution curve, see FIG. 13;
with Example 14 $M_n = 8.2 \times 10^3$; $M_w = 13.3 \times 10^7$; molecular weight distribution curve, see FIG. 14;
with Example 15 $M_n = 7.9 \times 10^3$; $M_w = 12.6 \times 10^7$; molecular weight distribution curve, see FIG. 15;
with Example 16 $M_n = 7.4 \times 10^3$; $M_w = 11.3 \times 10^7$; molecular weight distribution curve, see FIG. 16;
with Example 17 $M_n = 8.9 \times 10^3$; $M_w = 15.1 \times 10^7$; molecular weight distribution curve, see FIG. 17;
with Example 18 $M_n = 8.0 \times 10^3$; $M_w = 13.6 \times 10^7$; molecular weight distribution curve, see FIG. 18.

Examples 13a-18a

The polymerizations described in Examples 13 to 18 are also conducted in the presence of compounds having crosslinking activity. In this connection, the following components are utilized, for example:

18 parts (225 g) of phenyl-substituted acrylic acid ester, prepared according to Examples 1-6
4 parts (50 g) of butyl acrylate
76 parts (950 g) of fully demineralized water
0.2 part (2.5 g) of diallyl phthalate
0.24 part (3.0 g) of Na laurate The following compounds are introduced into the receiver of the metering means:

0.012 part (0.15 g) of ammonium peroxodisulfate
4 parts (50 g) of fully demineralized water In each case, a white, stable polyacrylate latex is obtained.

Figure 19:
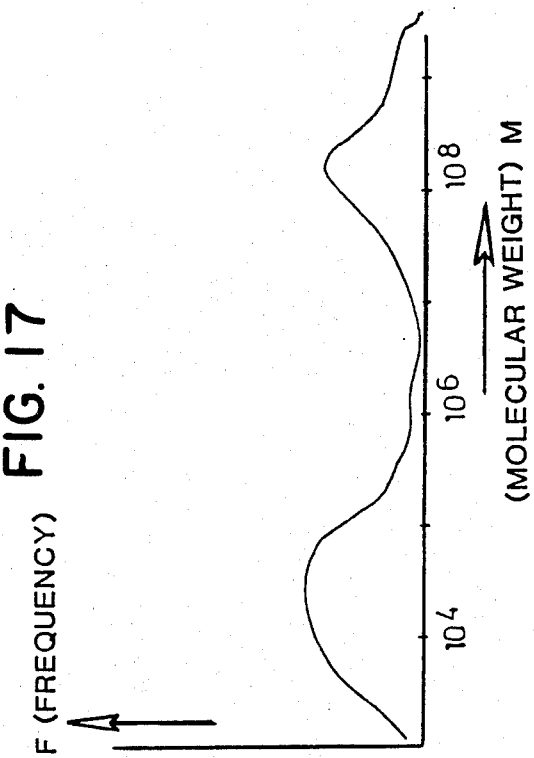
Figure 20:
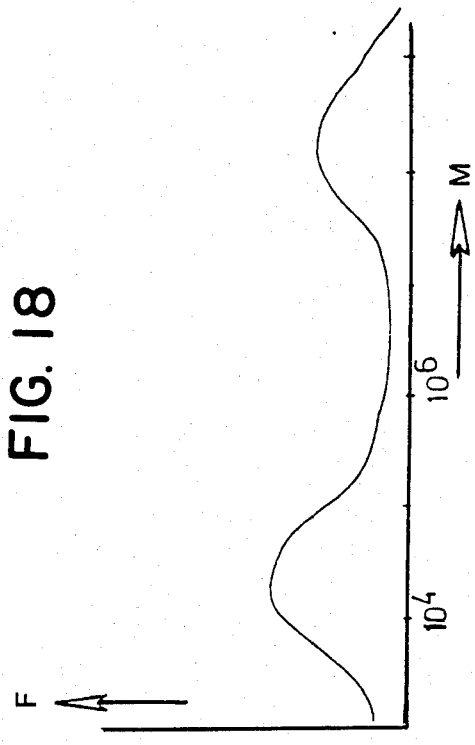
Figure 21:
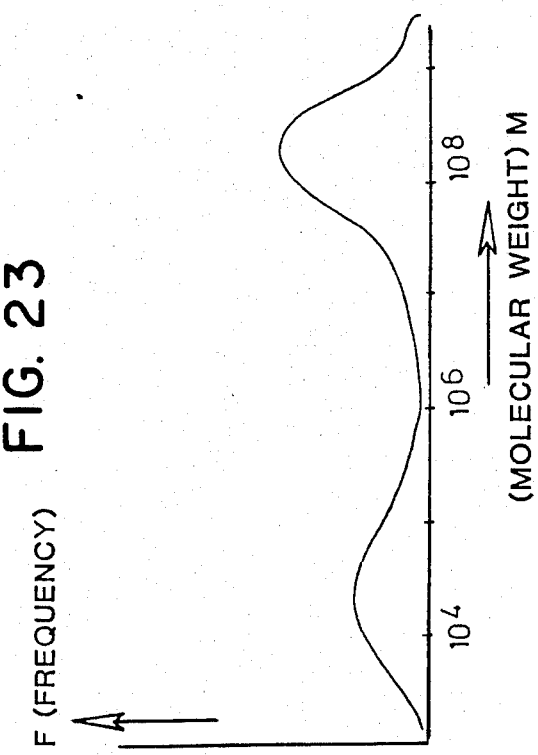
Figure 23:
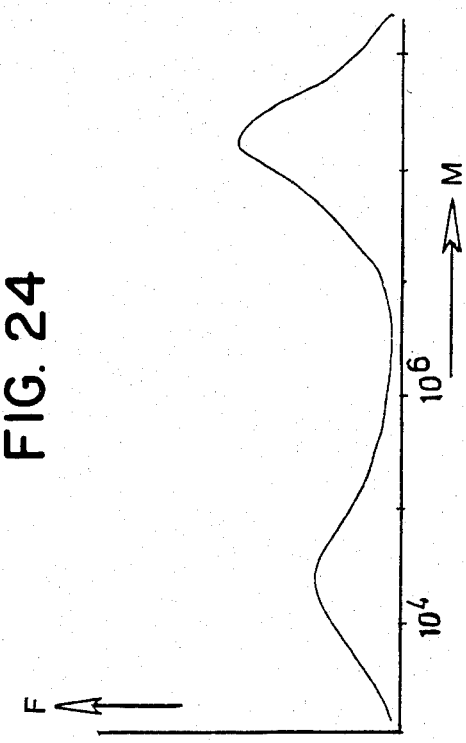
Figure 22:
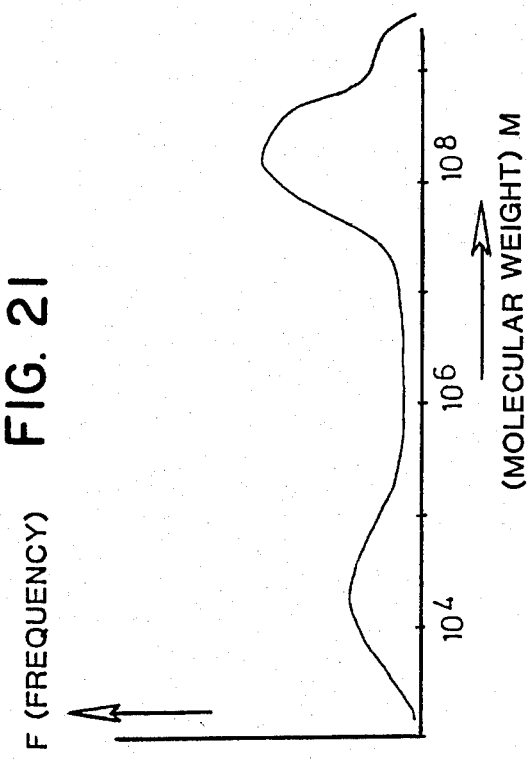
Figure 24:
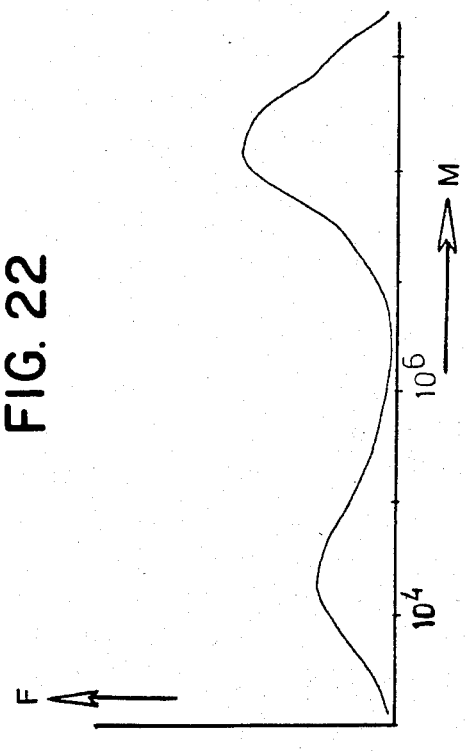

Molecular weight characterization by GPC (see note in Example 7) yields the following:

with Example 13a $M_n = 3.1 \times 10^4$; $M_w = 29.7 \times 10^7$; molecular weight distribution curve, see FIG. 19;

with Example 14a $M_n = 2.6 \times 10^4$; $M_w = 25.6 \times 10^7$; molecular weight distribution curve, see FIG. 20;

with Example 15a $M_n = 2.96 \times 10^4$; $M_w = 24.9 \times 10^7$; molecular weight distribution curve, see FIG. 21;

with Example 16a $M_n = 2.76 \times 10^4$; $M_w = 30.8 \times 10^7$; molecular weight distribution curve, see FIG. 22;

with Example 17a $M_n = 2.1 \times 10^4$; $M_w = 29.4 \times 10^7$; molecular weight distribution curve, see FIG. 23;

with Example 18a $M_n = 2.8 \times 10^4$; $M_w = 30.1 \times 10^7$; molecular weight distribution curve, see FIG. 24.

(C) PREPARATION OF MIXTURE FROM POLYVINYL CHLORIDE AND POLYACRYLIC ACID ESTER

(a) Graft Polymerization of Vinyl Chloride with Polyacrylic Acid Ester

Examples 19-32

The following compounds are charged into a 2-liter steel autoclave of the model described in (B):

50 parts (200 g) of polyacrylate latex, prepared according to Examples 7, 7a, 8, 8a, 12, 12a, 13, 13a, 14, 14a, 15, 15a, 18, 18a (corresponding respectively to 40 g of solid polymer and 160 g of water)
160 parts (640 g) of fully demineralized water
0.03 part (0.12 g) of sorbitan monolaurate
0.08 part (0.32 g) of lauroyl peroxide
0.06 part (0.24 g) of dicetyl peroxydicarbonate After removing the gases from the thus-provided mixture and purging same with nitrogen, the following compound is introduced under pressure into the autoclave under agitation at 200-300 rpm:

90 parts (360 g) of vinyl chloride and thereafter the agitator speed is increased to 350 rpm. Then, 0.4 part (1.6 f) of hydroxyethylcellulose, dissolved in 50 parts (200 g) of fully demineralized water, is added thereto and the nitrogen pressure is set to 2 bar.

The reactor content is heated to 60° C. and the polymerization is completed at this temperature within about 6 hours up to a pressure drop by 3 bar.

After cooling, removal of residual gaseous VC, filtration, washing, and drying, a pourable powder is obtained having an average grain diameter of 100-150 μm.

Table 1 indicates the values determined for impact resistance and transparency.

Example 33

A 2-liter steel autoclave of the model described in (B) is charged with the following:

50 parts (200 g) of poly-5-phenylpentyl acrylate latex, prepared from 5-phenylpentyl acrylate with 20% polymer proportion (corresponding to 40 g of solid polymer and 160 g of water)
160 parts (640 g) of fully demineralized water
0.03 part (0.12 g) of sorbitan monolaurate
0.08 part (0.32 g) of lauroyl peroxide
0.06 part (0.24 g) of dicetyl peroxydicarbonate After removing the gases from the thus-provided mixture and purging same with nitrogen, the following compound is introduced under pressure into the autoclave under agitation at 200-300 rpm:

90 parts (360 g) of vinyl chloride and thereafter the agitator speed is increased to 350 rpm. Then, 0.4 part (1.6 g) of hydroxyethylcellulose, dissolved in 50 parts (200 g) of fully demineralized water, is added thereto and the nitrogen pressure is set to 2 bar.

The reactor content is heated to 60° C. and the polymerization is completed at this temperature within about 6 hours up to a pressure drop by 3 bar.

After cooling, removal of residual gaseous VC, filtration, washing, and drying, a pourable powder is obtained having an average grain diameter of 100-150 μm.

The values for impact resistance and transparency can be derived from Table 1.

(b) Blending of Polyacrylic Acid Ester (PA) and Bulk-Polymerized Polyvinyl Chloride (Bulk PVC)

Examples 34-48

100 parts of bulk PVC (prepared, for example, according to DOS No. 1,520,595) is blended in a laboratory mixer with 55 parts of polyacrylate latex with 20% by weight of polymer proportion (prepared according to Examples 7, 7a, 8, 8a, 12, 12a, 13, 13a, 14, 14a, 15, 15a, 18, 18a, and the latex of Ex. 33, and dried under vacuum for 12 hours at 50° C.

A no longer pourable powder is obtained which, for example, can be processed on a roller mill.

The values determined for impact resistance and transparency are set forth in Table 1.

(c) Blending of Polyacrylic Acid Ester (PA) and Suspension Polyvinyl Chloride (S PVC)

Examples 49-63

100 parts of S PVC (prepared, for example, according to DOS No. 1,595,431) is blended in a laboratory mixer with 55 parts of PA latex (produced according to Examples 7, 7a, 8, 8a, 12, 12a, 13, 13a, 14, 14a, 15, 15a, 18, 18a, and the latex of Example 33, and dried under vacuum at 50° C.

A powder is obtained which is no longer pourable, which, for example, can be processed on a roller mill.

Table 1 shows the values determined for impact resistance and transparency.

(d) Blending of PA and Emulsion Polyvinyl Chloride (E PVC)

Examples 64-68

100 parts (5,000 g) of E PVC latex with 45% PVC (prepared, for example, according to DOS No. 2,531,780) and 22.5 parts (1,125 g) of PA latex (with 20% by weight of polymer proportion, prepared as described in Examples 7a, 8a, 12a, 13a, 14a)

are spray-dried together in a "Nubilosa" laboratory spray-drying device, obtaining a powder of limited pourability.

Table 1 sets forth the values determined for impact resistance and transparency.

(e) Hot Blending of Polymers of the Phenyl-Substituted Acrylic Acid Esters of This Invention with PVC

Examples 69-73

First of all, the polyacrylate latices, produced according to Examples 7a, 8a, 12a, 13a, 14a, are worked up so that the pure polymer is obtained. For this purpose, respectively 250 g of the above-mentioned polyacrylate latex is combined under agitation with 100 g of methanol and 100 g of 5% aqueous Na formate solution. The thus-precipitated polyacrylate is filtered through a porous plate, washed with methanol and fully demineralized water, and dried under vacuum for 24 hours at 40° C. 10 parts (40 g) of thus-obtained polymer is mixed on a roller mill for 5–15 minutes at 185° C. with respectively 90 parts (360 g) of bulk PVC (prepared, for example, according to DOS No. 1,595,431) using the processing aids and stabilizing aids utilized for all processing operations and described below. A rolled sheet is obtained which is further processed as usual into pressed panels.

Table 1 shows the values determined for impact resistance and transparency

TABLE 1

| (X) Modified Polyvinyl Chloride | (Y) Transmission Layer Thickness 2 mm, Wavelength 600 nm | (Z) Notch Impact Resistance in kJ/m², 4-mm Pressed Panels Acc. to DIN 53453 |
|---|---|---|
| Bulk Polyvinyl Chloride Acc. to DOS 1,520,595 (Standard Sample) | 81 | 2 |
| DAS 2,013,020 According to Invention | 57 | 22 |
| Example 19 | 87 | 38 |
| Example 20 | 88 | 43 |
| Example 21 | 84 | 39 |
| Example 22 | 86 | 45 |
| Example 23 | 80 | 39 |
| Example 24 | 80 | 40 |
| Example 25 | 85 | 41 |
| Example 26 | 85 | 46 |
| Example 27 | 84 | 39 |
| Example 28 | 84 | 43 |
| Example 29 | 82 | 22 |
| Example 30 | 82 | 23 |
| Example 31 | 81 | 44 |
| Example 32 | 82 | 44 |
| Example 33 | 81 | 48 |
| Example 34 | 85 | 40 |
| Example 35 | 82 | 34 |
| Example 36 | 84 | 42 |
| Example 37 | 79 | 36 |
| Example 38 | 78 | 40 |
| Example 39 | 82 | 40 |
| Example 40 | 82 | 40 |
| Example 41 | 82 | 37 |
| Example 42 | 81 | 41 |
| Example 43 | 78 | 21 |
| Example 44 | 79 | 20 |
| Example 45 | 81 | 41 |
| Example 46 | 79 | 43 |
| Example 47 | 84 | 36 |
| Example 48 | 78 | 45 |
| Example 49 | 81 | 40 |
| Example 50 | 80 | 41 |
| Example 51 | 77 | 36 |
| Example 52 | 78 | 37 |
| Example 53 | 81 | 42 |
| Example 54 | 80 | 44 |
| Example 55 | 79 | 40 |
| Example 56 | 80 | 41 |
| Example 57 | 76 | 22 |
| Example 58 | 78 | 21 |
| Example 59 | 77 | 42 |
| Example 60 | 78 | 42 |
| Example 61 | 80 | 38 |
| Example 62 | 80 | 35 |
| Example 63 | 79 | 36 |
| Example 64 | 78 | 33 |
| Example 65 | 77 | 40 |
| Example 66 | 80 | 35 |
| Example 67 | 81 | 34 |
| Example 68 | 78 | 37 |
| Example 69 | 79 | 40 |
| Example 70 | 78 | 39 |

The following processing formulation was employed for the testing operations:

| | |
|---|---|
| Polyvinyl chloride (or modified polyvinyl chloride) | 100 parts by weight |
| Ba—Cd Stabilizer | 2.5 parts by weight |
| Polyethylene mold release agent | 0.15 part by weight |
| Polymethyl methacrylate processing aid | 1.2 parts by weight |
| Liquid partial fatty acid ester of glycerol | 0.4 part by weight |
| Solid neutral glycerol ester wax | 0.4 part by weight |

By producing the test specimens, rolled sheets were first of all produced at a rolling temperature of 185° C. and a rolling period of 5 minutes. After pressing into panels having a thickness of 2 mm and 4 mm, respectively, the measurements for transmission and notch impact resistance indicated in Table 1 were carried out.

When evaluating transparency, one must keep in mind that polyvinyl chloride, due to its tendency to decompose during the processing operation, must be stabilized in a special way as compared with other thermoplastics. This impairs transparency, as compared with other thermoplastics. Bulk-polymerized polyvinyl chloride, being the purest polyvinyl chloride, should exhibit maximum transparency possible in this thermoplastic. Therefore, if an impact-resistant, i.e. modified polyvinyl chloride exhibits transparencies closely approaching the transparency of pure bulk polyvinyl chloride, such transparencies should approximately represent the maximum possible in this area. However, if one finds, as has been demonstrated by several of our examples, that the modified polyvinyl chloride exhibits even markedly higher transparencies than bulk polyvinyl chloride, then a genuine, surprising effect is involved.

In this connection, consideration must furthermore be given to the fact that transparency, also in case of bulk polyvinyl chloride, is dependent on the respective recipe, i.e. the additives (indispensable for processing) of mold release agent, stabilizers, and the like, and that comparisons must only be made for absolutely identical recipes and, of course, identical layer thickness.

Furthermore, it should be pointed out that the polyvinyl chloride modified in accordance with this invention exhibits a particularly high impact resistance.

The modified polyvinyl molding compositions of this invention have a very good weatherability. The weathering resistance of such products was confirmed by weatherometer tests. Thus it is confirmed, that the molding compositions of this invention have a weathering resistance which is comparable with that of normally high impact polyvinylchlorides based on alkyl acrylates.

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

What is claimed is:

1. A modified polyvinyl chloride molding composition, comprising (1) a major proportion of polyvinyl chloride or a copolymer comprising at least 70% by weight of vinyl chloride units; and (2) an amount effective to impart impact resistance and high transparency of (a) at least one homopolymer of an acrylate monomer having the formula

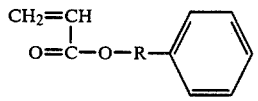

wherein R is a straight-chain or branched alkylene residue of 3-8 carbon atoms, optionally interrupted by 1-2 ether oxygen atoms, wherein the straight-chain portion of said alkylene residue contains at least 3 carbon atoms; or (b) a copylymer of said acrylate monomer and up to 30% by weight of at least one acrylate ester of a $C_{4-12}$ aliphatic alcohol.

2. A molding composition according to claim 1, wherein said acrylate homopolymer or copolymer imparting impact resistance has a weight average molecular weight of about $10^4$ to about $5 \times 10^8$.

3. A molding composition according to claim 2, wherein said weight average molecular weight is about $5 \times 10^4$ to $5 \times 10^7$.

4. A molding composition according to claim 1, wherein said effective amount is about 1-30% by weight, based on the mixture of said polyvinyl chloride or vinyl chloride copolymer and said acrylate homopolymer or copolymer.

5. A molding composition according to claim 4, wherein said effective amount is about 3-15% by weight.

6. A molding composition according to claim 1, wherein said acrylate homopolymer or copolymer is crosslinked with about 0.1-2% by weight of a bis-ethylenic crosslinking agent.

7. A molding composition according to claim 6, wherein said crosslinking agent is a lower alkylene glycol dimethacrylate or diacrylate.

8. A molding composition according to claim 1, wherein R is propylene, butylene or pentylene.

9. A molding composition according to claim 8, wherein said acrylate polymer is a homopolymer.

10. A molding composition according to claim 8, where said acrylate polymer is a copolymer; and wherein said acrylate ester of a $C_{4-12}$ aliphatic alcohol is n-butyl or 2-ethylhexyl acrylate.

11. In a molded polyvinyl chloride article produced by molding a molding composition comprising a major proportion of polyvinyl chloride or polyvinyl chloride copolymer, the improvement wherein said molding composition is a molding composition according to claim 1; whereby said molded article has high transparency and high impact resistance.

12. A molded article according to claim 11 having a higher transparency than a molded bulk polyvinyl chloride article.

13. A method of imparting high impact resistance to a molded polyvinyl chloride article, comprising molding said article from a molding composition according to claim 1.

14. A method according to claim 13, wherein the amount and type of polyacrylate polymer are such that the resultant molded article has a higher transparency than a molded bulk polyvinyl chloride article.

15. A molding composition according to claim 1, wherein said polyvinyl chloride is grafted onto said acrylate homopolymer or copolymer.

16. A process for preparing a molding composition according to claim 1, comprising the step of polymerizing vinyl chloride in the presence of said acrylate homopolymer or copolymer and in the presence of at least one radical catalyst.

* * * * *